United States Patent
Bao et al.

(10) Patent No.: US 10,990,138 B1
(45) Date of Patent: Apr. 27, 2021

(54) CONTAINING MODULE AND PORTABLE ELECTRONIC DEVICE THEREOF

(71) Applicant: Wistron Corporation, New Taipei (TW)

(72) Inventors: XingLiang Bao, New Taipei (TW); Cheng Zhao, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/812,380

(22) Filed: Mar. 9, 2020

(30) Foreign Application Priority Data

Nov. 26, 2019 (CN) .......................... 201922069941.1

(51) Int. Cl.
*G06F 1/16* (2006.01)
*F16C 11/04* (2006.01)
*E05D 3/12* (2006.01)
*E05D 11/00* (2006.01)

(52) U.S. Cl.
CPC ............. *G06F 1/1681* (2013.01); *E05D 3/12* (2013.01); *E05D 11/00* (2013.01); *F16C 11/04* (2013.01); *G06F 1/1615* (2013.01); *G06F 1/1637* (2013.01); *G06F 1/1675* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,958,902 | B2 * | 10/2005 | Tseng | G06F 1/162 |
| | | | | 248/176.3 |
| 9,003,607 | B1 * | 4/2015 | Hsu | G06F 1/162 |
| | | | | 16/366 |
| 9,439,311 | B2 * | 9/2016 | Hsu | E05D 3/122 |
| 9,462,713 | B2 * | 10/2016 | Hsu | F16H 21/44 |
| 9,678,541 | B2 * | 6/2017 | Hsu | G06F 1/1681 |
| 10,108,224 | B2 * | 10/2018 | Tsubaki | G06F 1/1616 |
| 2020/0371562 | A1 * | 11/2020 | Miyamoto | G06F 1/1681 |

* cited by examiner

*Primary Examiner* — Lisa Lea-Edmonds
(74) *Attorney, Agent, or Firm* — Winston Hsu

(57) ABSTRACT

A containing module includes a connection casing, a tubular member, and first and second connection members. A tubular structure extends inwardly from a first end portion of the connection casing and has first and second guide portions. The first guide portion extends inwardly from the tubular structure. The second guide portion extends from the first guide portion. The first and second connection members are pivoted to a second end portion of the connection casing. A protruding point protrudes from the tubular member corresponding to the first guide portion. The protruding point is movable along the first guide portion and the second guide portion.

20 Claims, 9 Drawing Sheets

CONTAINING MODULE AND PORTABLE ELECTRONIC DEVICE THEREOF

BACKGROUND OF THE INVENTION

1. Field of the Invention

The present disclosure relates to a containing module and a portable electronic device thereof, and more specifically, to a containing module containing a tubular member in a connection casing via guiding engagement of a protruding point of the tubular member and guide portions in the containing casing.

2. Description of the Prior Art

In general, a notebook or a foldable electronic product adopts a pivot design that a hinge mechanism is rotatably connected to a display monitor and a system host, so as to make the display monitor capable of rotating to cover the system host (for a user to place or carry it conveniently) or rotating an expanding angle (e.g. 120°) relative to the system host for operational convenience. In practical application, for providing a wireless communication function and meeting the thinning requirement, the design in which an antenna is contained in a hinge mechanism is adopted. The conventional design involves utilizing a tubular member to fix the antenna in the hinge mechanism via hook-to-slot engagement of the tubular member and the hinge mechanism.

However, in the aforesaid engagement design, it is hard to detach the tubular member from the hinge mechanism to cause time-consuming and strenuous assembly and disassembly processes of the antenna and the hinge mechanism. Furthermore, rotation of antenna wires together with pivoting of the hinge mechanism may occur when a user rotates the display monitor. In this situation, the tubular member may rotate together with the antenna wires to easily result in detachment of the tubular member from the hinge mechanism, so as to cause the user much inconvenience in operating the notebook or the foldable electronic product.

SUMMARY OF THE INVENTION

The present disclosure provides a containing module. The containing module includes a connection casing, a first connection member, a second connection member, and a tubular member. The connection casing has a first end portion and a second end portion and includes a tubular structure. The tubular structure extends inwardly from the first end portion and has a first guide portion and a second guide portion. The first guide portion extends along an inner wall of the tubular structure. The second guide portion extends from an end of the first guide portion along the inner wall. The first connection member is pivoted to the second end portion. The second connection member is pivoted to the second end portion. The tubular member has a first protruding point protruding from the tubular member corresponding to the first guide portion. The first protruding point is movable along the first guide portion and the second guide portion.

The present disclosure further provides a portable electronic device. The portable electronic device includes a first body, a second body, and a containing module. The first body is rotatable relative to the second body via the containing module. The containing module includes a connection casing, a first connection member, a second connection member, and a tubular member. The connection casing has a first end portion and a second end portion and includes a tubular structure. The tubular structure extends inwardly from the first end portion and has a first guide portion and a second guide portion. The first guide portion extends along an inner wall of the tubular structure. The second guide portion extends from an end of the first guide portion along the inner wall. The first connection member is fixed to the first body and pivoted to the second end portion. The second connection member is fixed to the second body and pivoted to the second end portion. The tubular member contains an antenna and has a first protruding point protruding from the tubular member corresponding to the first guide portion. The first protruding point is movable along the first guide portion and the second guide portion.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
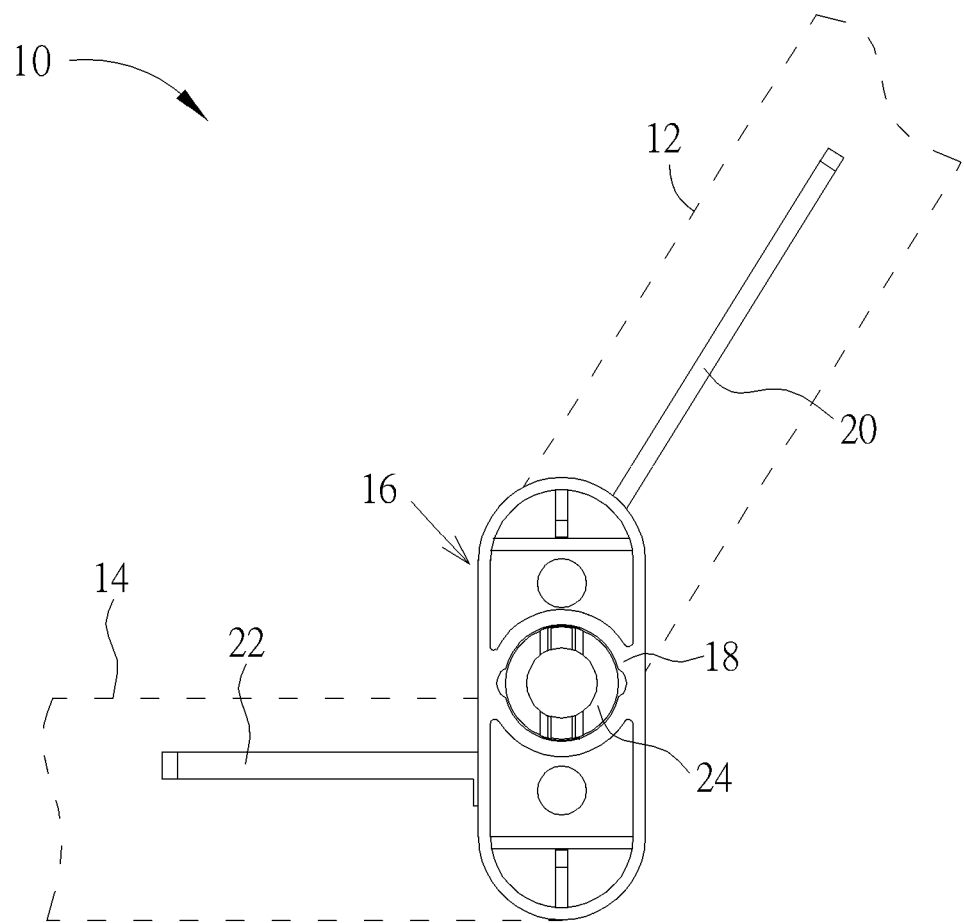
FIG. 1 is a partial enlarged side view of a portable electronic device according to an embodiment of the present disclosure.

Please refer to FIG. 1, which is a partial enlarged side view of a portable electronic device 10 according to an embodiment of the present disclosure. As shown in FIG. 1, the portable electronic device 10 includes a first body 12, a second body 14, and a containing module 16. The first body 12 and the second body 14 (briefly depicted by dotted lines in FIG. 1) are pivoted to each other via the containing module 16, so that the first body 12 could rotate to cover the second body 14 or expand relative to the second body 14. In this embodiment, the portable electronic device 10 could be preferably a notebook, the first body 12 could be preferably a display monitor, and the second body 14 could be preferably a system host (but the present disclosure is not limited thereto).

Figure 2:
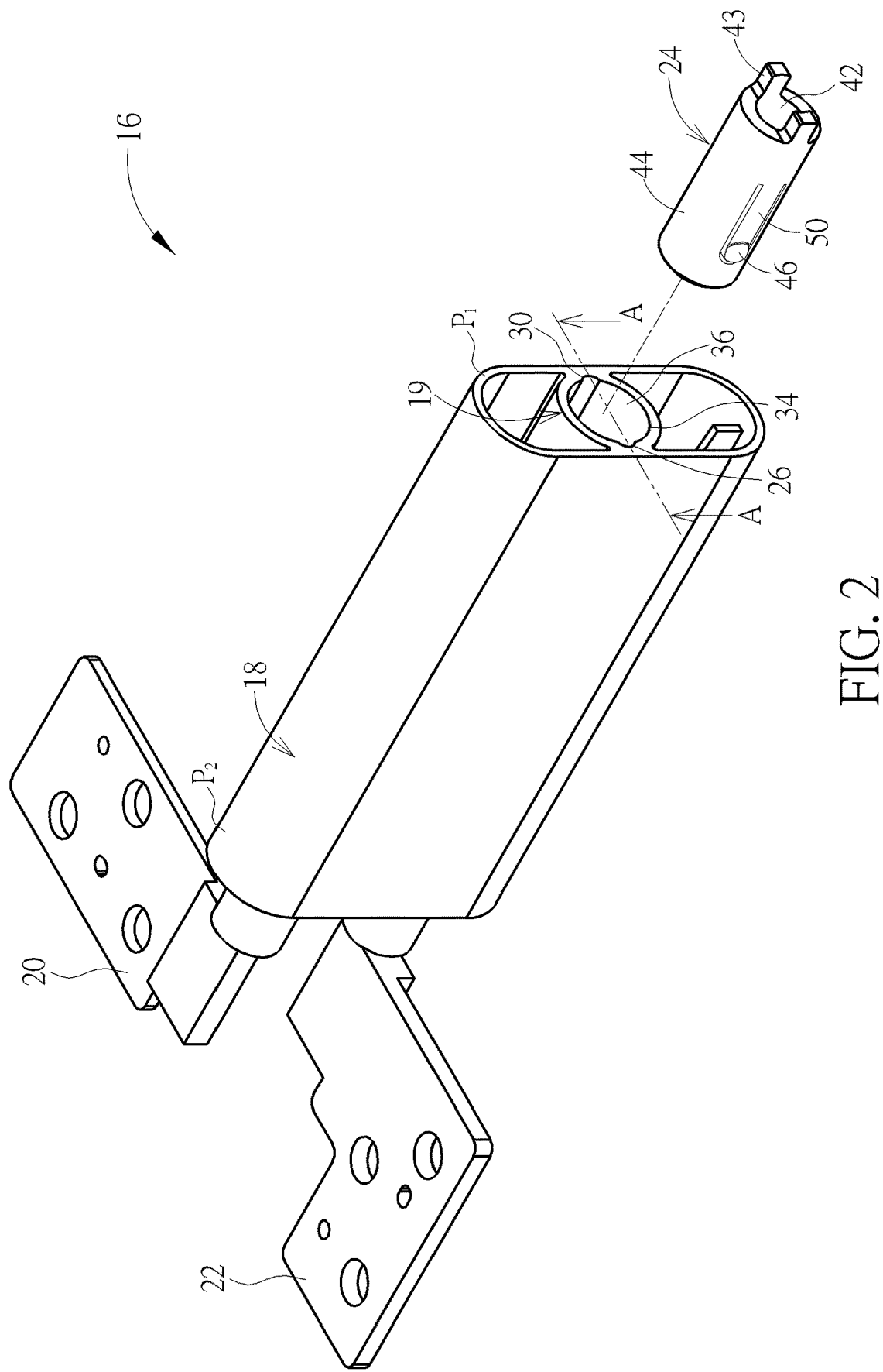
FIG. 2 is a partial exploded diagram of a containing module in FIG. 1.
Figure 3:
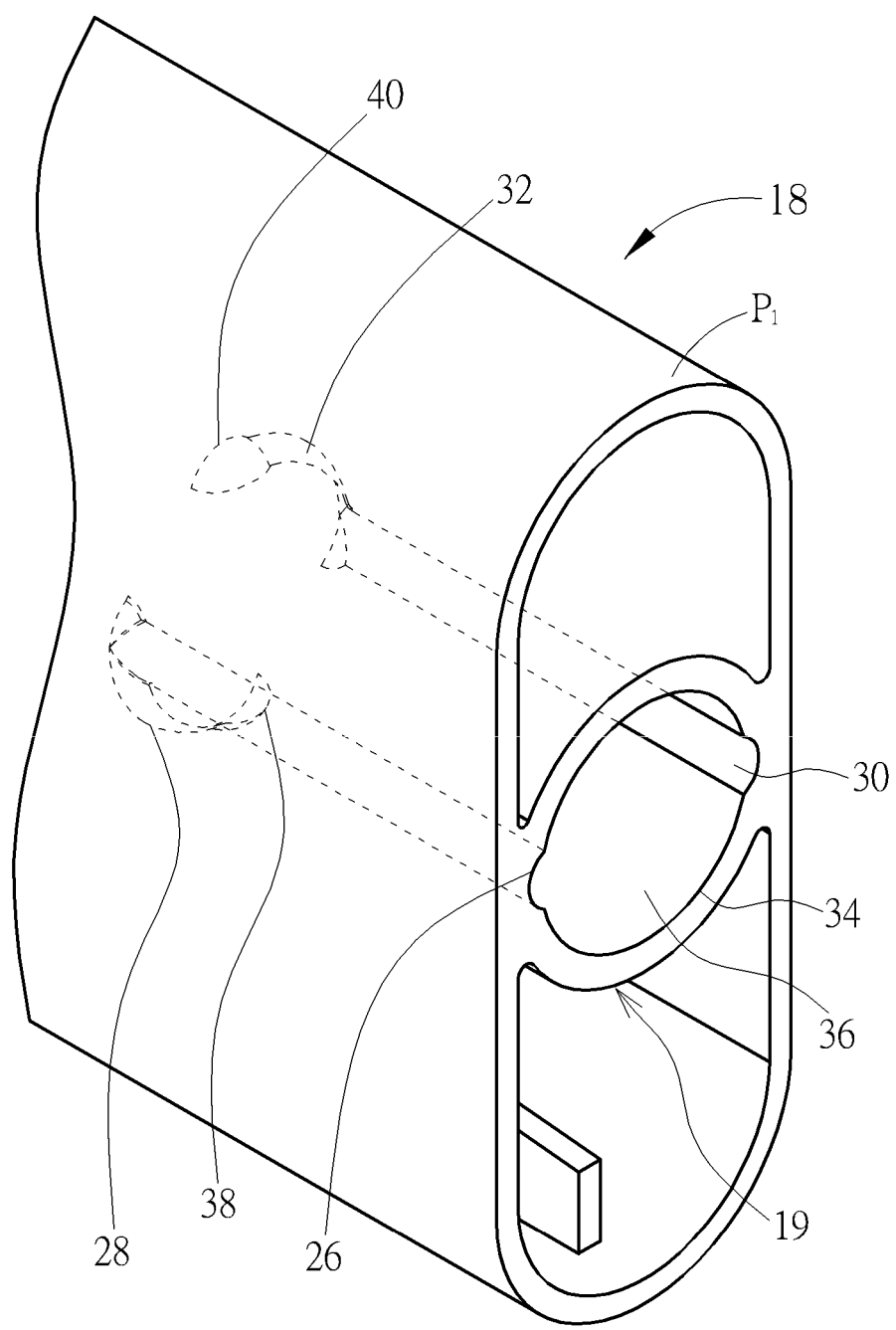
FIG. 3 is a partial enlarged diagram of a connection casing in FIG. 2.
Figure 4:
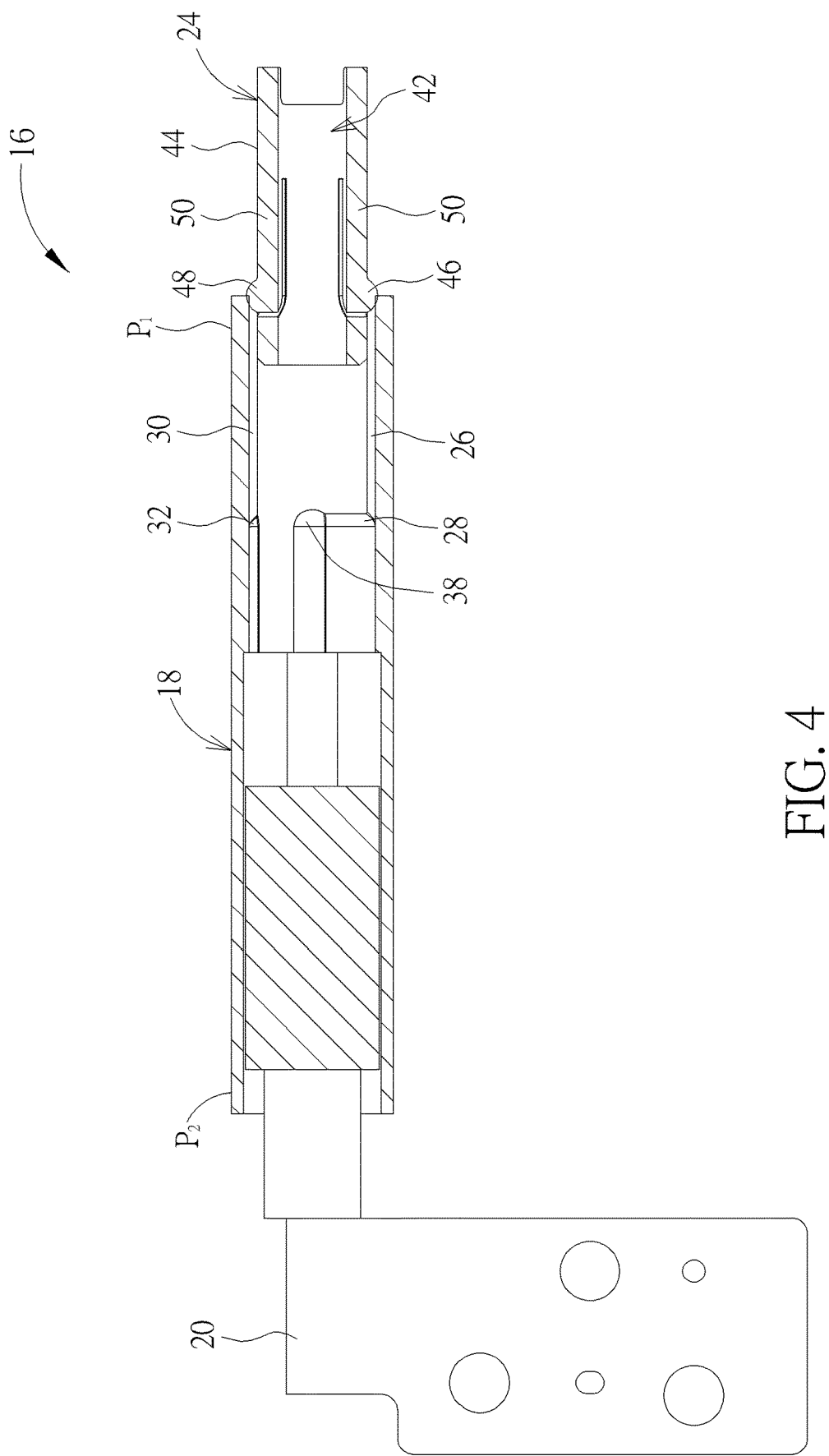
FIG. 4 is a cross-sectional diagram of the containing module along a cross-sectional line A-A when a tubular member has not been completely inserted into the connection casing.

Please refer to FIG. 2, FIG. 3, and FIG. 4. FIG. 2 is a partial exploded diagram of the containing module 16 in FIG. 1. FIG. 3 is a partial enlarged diagram of a connection casing 18 in FIG. 2. FIG. 4 is a cross-sectional diagram of the containing module 16 along a cross-sectional line A-A when the tubular member 24 has not been completely inserted into the connection casing 18. For clearly showing the internal structural design of the connection casing 18, the partial internal structure of the connection casing 18 is depicted by dotted lines in FIG. 3. As shown in FIG. 2, FIG. 3, and FIG. 4, the containing module 16 includes the connection casing 18, a first connection member 20, a second connection member 22, and the tubular member 24 (preferably in a hollow cylindrical shape, but the present disclosure is not limited thereto). The connection casing 18 has a first end portion $P_1$ and a second end portion $P_2$ and includes a tubular structure 19 (preferably in a hollow cylindrical shape, but the present disclosure is not limited thereto). The tubular structure 19 extends inwardly from the first end portion $P_1$ and has a first guide portion 26, a second guide portion 28, a third guide portion 30, and a fourth guide portion 32. In this embodiment, the first guide portion 26 and the third guide portion 30 could be preferably linear guide rails extending from an opening 34 of the tubular structure 19 (but the present disclosure is not limited thereto) along an inner wall 36 of the tubular structure 19 and could be opposite to each other. The second guide portion 28 and the fourth guide portion 32 could be preferably arc-shaped guide rails respectively extending from ends of the first guide portion 26 and the third guide portion 30 along the inner wall 36. Accordingly, the tubular member 24 can be contained in the tubular structure 19 via guidance of the first guide portion 26, the second guide portion 28, the third guide portion 30, and the fourth guide portion 32. The first guide portion 26 could be preferably perpendicular to the second guide portion 28 and the third guide portion 30 could be preferably perpendicular to the fourth guide portion 32 (but the present disclosure is not limited thereto). Furthermore, for fixing the tubular member 24 in the connection casing 18 more steadily, an end of the second guide portion 28 could preferably have a concave hole 38 and an end of the fourth guide portion 32 could preferably have a concave hole 40 (but the present disclosure is not limited thereto). The first connection member 20 and the second connection member 22 are fixed to the first body 12 (preferably in a screw-locking manner, but the present disclosure is not limited thereto) and are pivoted to the second end portion $P_2$ of the connection casing 18. Via pivoting of the first connection member 20 and the second connection member 22 relative to the connection casing 18, the containing module 16 can make the first body 12 capable of covering the second body 14 for a user to place or carry the portable electronic device 10 conveniently, or capable of rotating an expanding angle relative to the second body 14 for operational convenience.

As for the structural design of the tubular member 24, it is as shown in FIGS. 2-4. The tubular member 24 could preferably have a tubular space 42 for containing an antenna (not shown in the figures of the present disclosure, and the design for containing the antenna in the tubular member 24 is commonly seen in the prior art and the related description is omitted herein), so as to provide a wireless communication function to the portable electronic device 10, but the present disclosure is not limited thereto. That is to say, in another embodiment, the present disclosure could adopt the design in which the tubular member is utilized to contain other components in the portable electronic device.

A first protruding point 46 is preferably formed on an external periphery 44 of the tubular member 24 corresponding to the first guide portion 26 and a second protruding point 48 is preferably formed on the external periphery 44 corresponding to the third guide portion 30 (but the present disclosure is not limited thereto). That is, the first protruding point 46 and the second protruding point 48 are located at two sides of the tubular member 24 respectively corresponding to the first guide portion 26 and the third guide portion 30.

In this embodiment, for improving assembly convenience of the tubular member 24 and the connection casing 18, two elastic arms 50 could be formed on the tubular member 24 and could extend to be connected to the first protruding point 46 and the second protruding point 48 respectively (as shown in FIG. 4). Accordingly, when the tubular member 24 is inserted into the connection casing 18, the tubular member 24 can utilize structural flexibility provided by the elastic arm 50 to make the first protruding point 46 and the second protruding point 48 deform inwardly when entering the first guide portion 26 and the third guide portion 30 respectively. In such a manner, the first protruding point 46 and the second protruding point 48 can move along the first guide portion 26 and the third guide portion 30 smoothly, so as to surely prevent structural jamming caused by excessive interference of the first protruding point 46 with the first guide portion 26 and excessive interference of the second protruding point 48 with the third guide portion 30.

To be noted, the elastic arm 50 could be an omissible component for simplifying the structural design of the tubular member 24. For example, in another embodiment that the elastic arm is omitted, the tubular member could utilize its structural flexibility or adopt the design that the protruding point is made of flexible material (e.g. forming the protruding point on the tubular member by a double injection process), to make the protruding point deformable when the tubular member is inserted into the connection casing. Accordingly, the tubular member can be movable along the guide portion smoothly. Moreover, a holding portion 43 is formed at an end of the tubular member 24 for a user to hold the tubular member 24 steadily to perform the rotating or inserting operation, so as to improve operational convenience of the tubular member 24.

Figure 5:
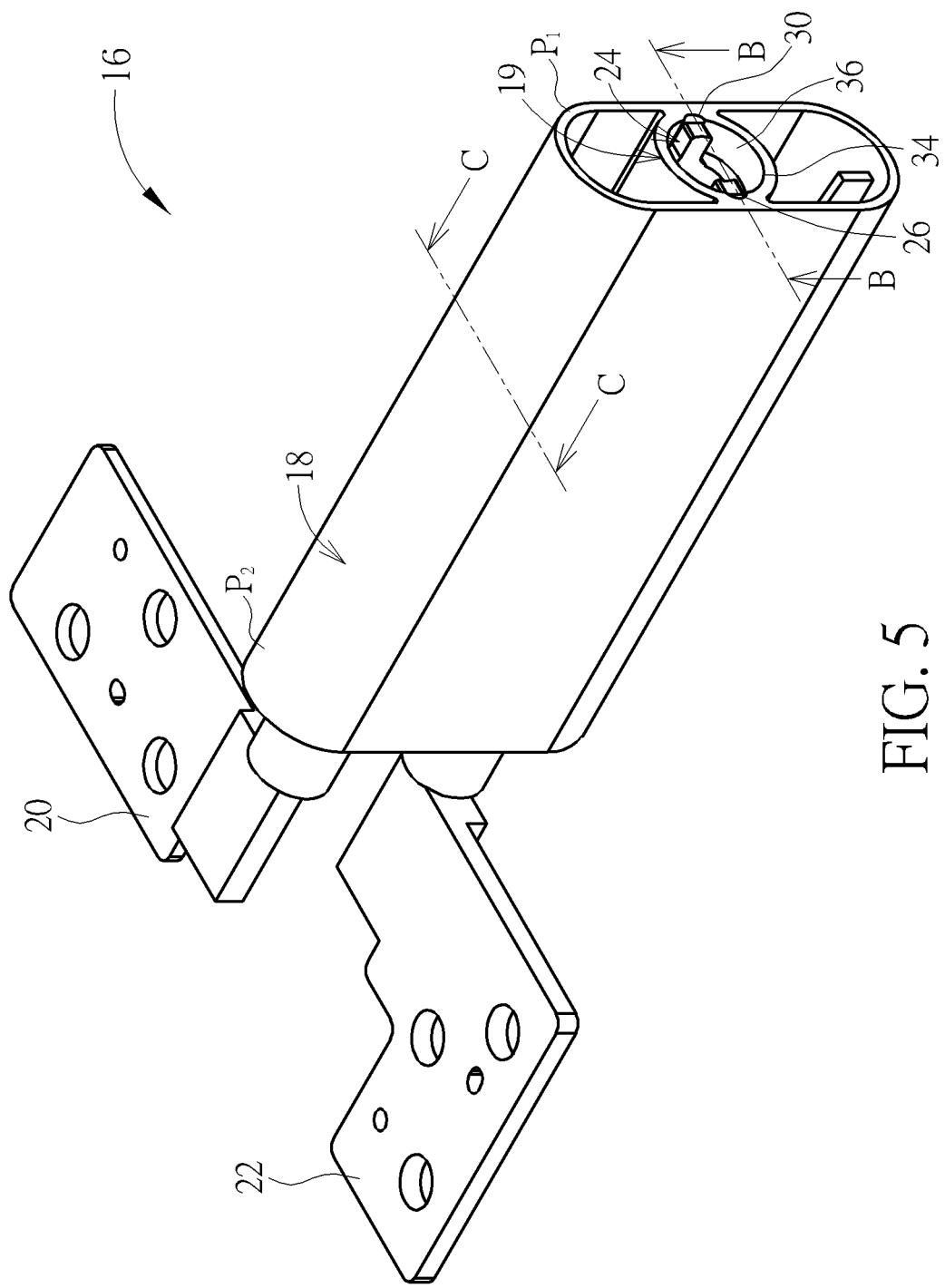
FIG. 5 is a diagram of the tubular member in FIG. 2 being inserted into the connection casing.
Figure 6:
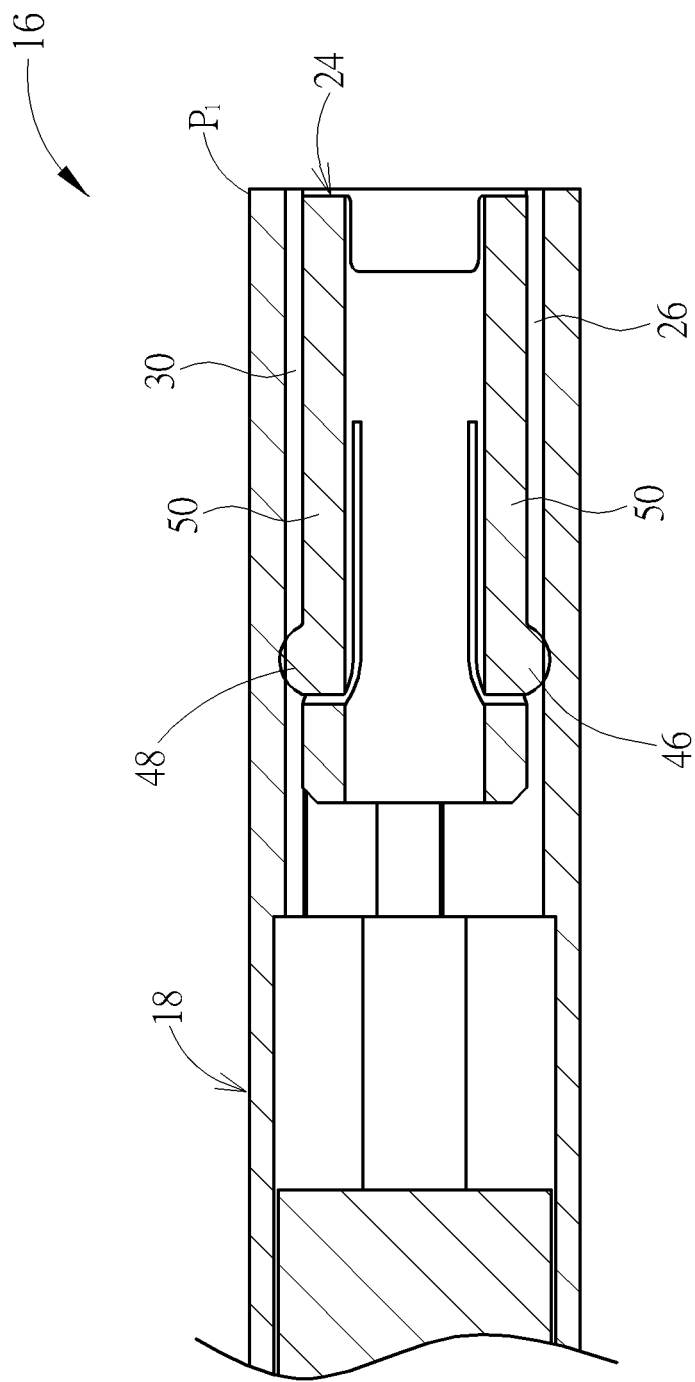
FIG. 6 is a cross-sectional diagram of the containing module in FIG. 5 along a cross-sectional line B-B.
Figure 7:
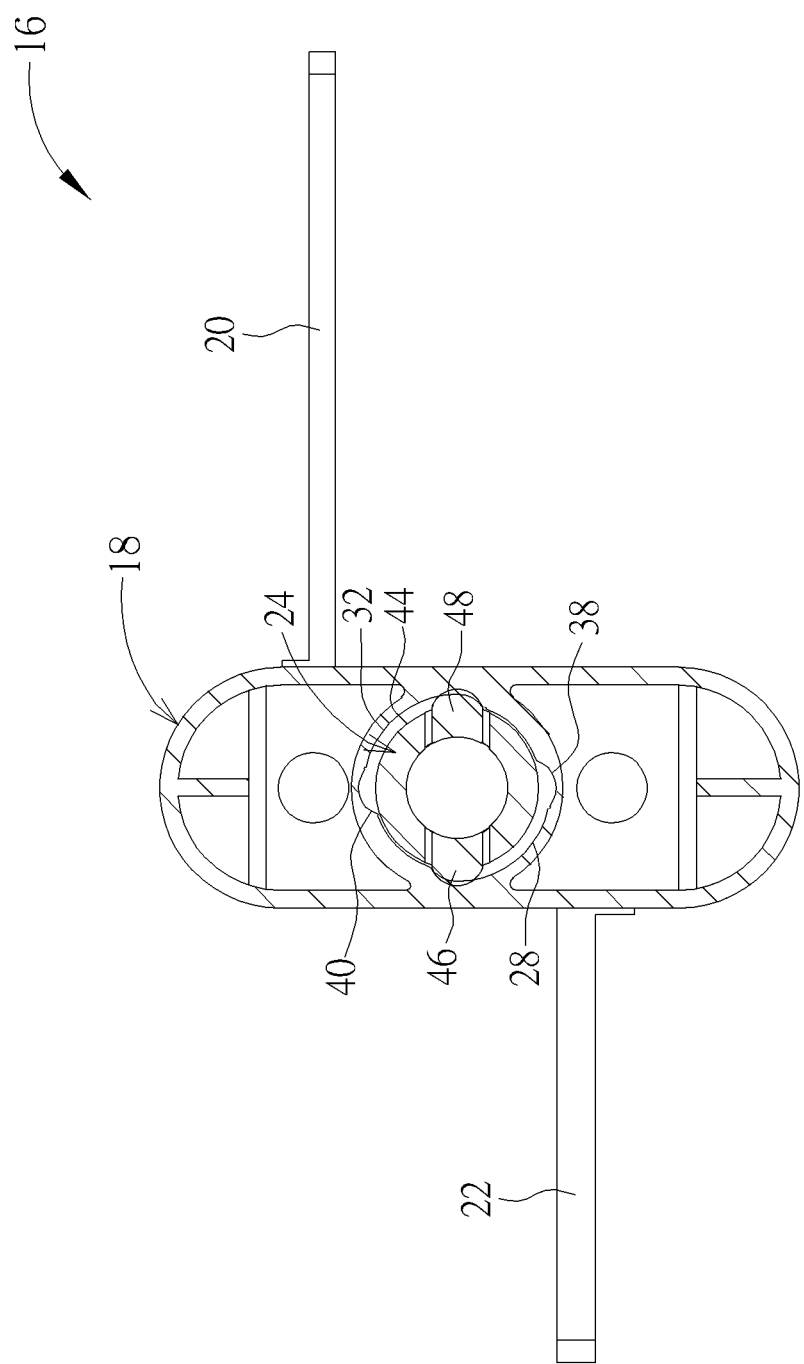
FIG. 7 is a cross-sectional diagram of the containing module in FIG. 5 along a cross-sectional line C-C.
Figure 8:
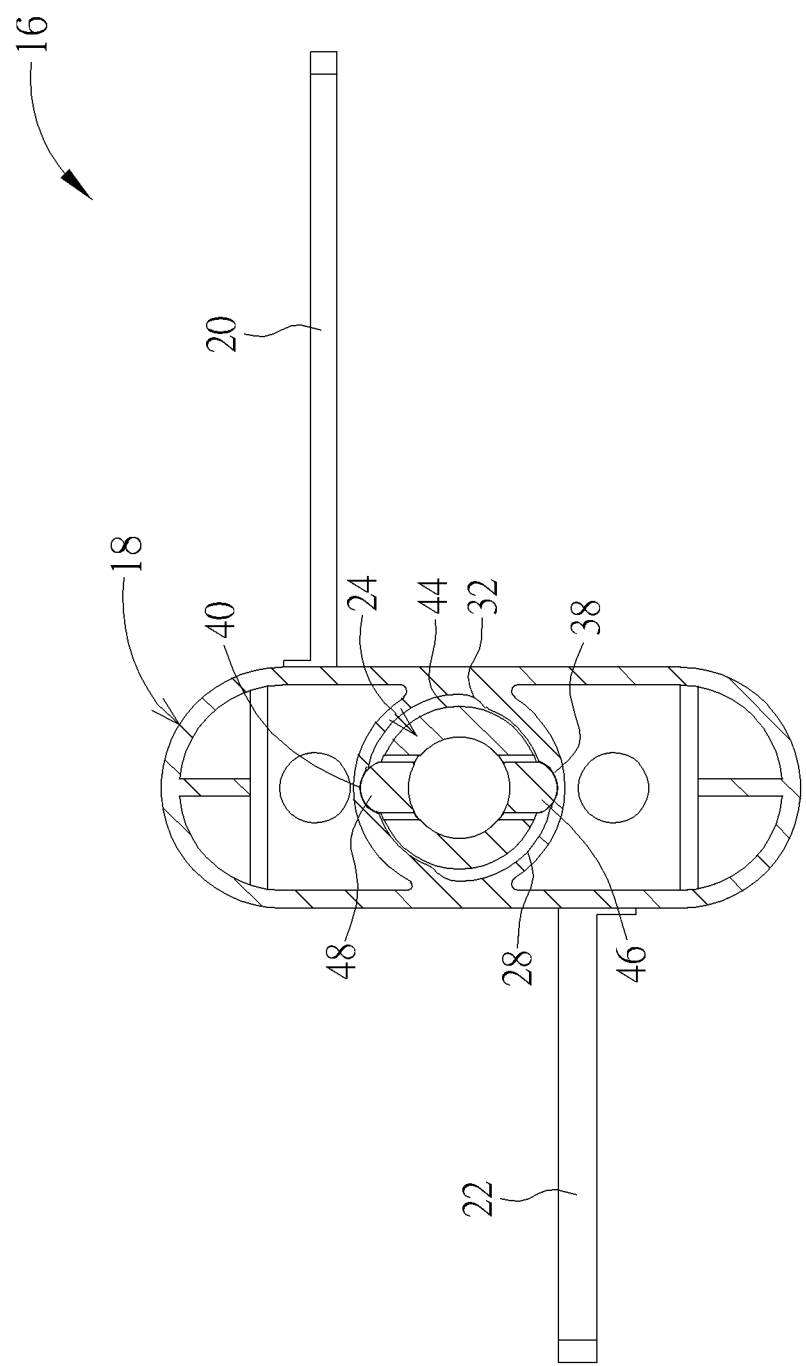
FIG. 8 is a cross-sectional diagram of the tubular member in FIG. 7 rotating to a position where a first protruding point and a second protruding point are engaged with a concave hole and a concave hole respectively.

More detailed description for the assembly and disassembly operations of the tubular member 24 and the connection casing 18 is provided as follows. Please refer to FIG. 2, FIG. 3, FIG. 4, FIG. 5, FIG. 6, FIG. 7, and FIG. 8. FIG. 5 is a diagram of the tubular member 24 in FIG. 2 being inserted into the connection casing 18. FIG. 6 is a cross-sectional diagram of the containing module 16 in FIG. 5 along a cross-sectional line B-B. FIG. 7 is a cross-sectional diagram of the containing module 16 in FIG. 5 along a cross-sectional line C-C. FIG. 8 is a cross-sectional diagram of the tubular member 24 in FIG. 7 rotating to a position where the first protruding point 46 and the second protruding point 48 are engaged with the concave hole 38 and the concave hole 40 respectively. When the user wants to assemble the tubular member 24 having an antenna disposed therein with the connection casing 18 for completing the antenna containing operation, the user just needs to align the first protruding point 46 and the second protruding point 48 with the first guide portion 26 and the third guide portion 30 respectively, and then the user can insert the tubular member 24 into the connection casing 18 from a position as shown in FIG. 4 to a position as shown in FIG. 5. During this process, the first protruding point 46 can move along the first guide portion 26 and the second guide portion 28, and the second protruding point 48 can move along the third guide portion 30 and the fourth guide portion 32, so as to guide the tubular member 24 to be contained in the tubular structure 19.

To be noted, in practical application, depths of the first guide portion 26 and the third guide portion 30 could be preferably less than depths of the second guide portion 28 and the fourth guide portion 32, and the depths of the second guide portion 28 and the fourth guide portion 32 could be preferably less than depths of the concave hole 38 and the concave hole 40. Via the aforesaid design, the present disclosure can remind the user that the tubular member 24 has been inserted and rotated to a fixed position.

Subsequently, the user can rotate the tubular member 24 (e.g. by utilizing an auxiliary tool or in a manual manner) counterclockwise by 90° relative to the connection casing 18 from a position as shown in FIG. 7 to a position as shown in FIG. 8 (the rotating angle depends on the forming positions of the concave hole 38 and the concave hole 40 and is not limited to 90°). In such a manner, the first protruding point 46 can move along the second guide portion 28 to be engaged with the concave hole 38, and the second protruding point 48 can move along the fourth guide portion 32 to be engaged with the concave hole 40. Accordingly, via engagement of the first protruding point 46 and the concave hole 38 and engagement of the second protruding point 48 and concave hole 40, the tubular member 24 can be fixed in the connection casing 18 steadily to complete the assembly operation of the tubular member 24 and the connection casing 18.

On the other hand, if the user wants to detach the tubular member 24 having the antenna disposed therein from the connection casing 18, the user just needs to rotate the tubular member 24 from the position as shown in FIG. 8 to the position as shown in FIG. 7, to make the first protruding point 46 be disengaged from the concave hole 38 and then move with rotation of the tubular member 24 to be aligned with the first guide portion 26 along the second guide portion 28. At the same time, with rotation of the tubular member 24, the second protruding point 48 can be disengaged from the concave hole 40 and then move to be aligned with the third guide portion 30. Subsequently, via movement of the first protruding point 46 along the first guide portion 26 and movement of the second protruding point 48 along the third guide portion 30, the user can extract the tubular member 24 from the connection casing 18 smoothly and quickly, so as to complete the disassembly operation of the tubular member 24 and the connection casing 18 for the following replacement or maintenance of the antenna.

In summary, the present disclosure adopts the design in which the protruding points of the tubular member are guided by the guide portions in the connection casing and then rotate to be engaged with the guide portions, to contain the tubular member in the connection casing steadily and make the tubular member quickly detachable from the connection casing. In such a manner, the present disclosure can efficiently solve the prior art problem that the assembly and disassembly processes of the antenna and the hinge mechanism are time-consuming and strenuous and the tubular member may rotate together with the antenna wires to easily result in detachment of the tubular member from the hinge mechanism, so as to improve the connection stability and assembly convenience of the containing module.

Figure 9:
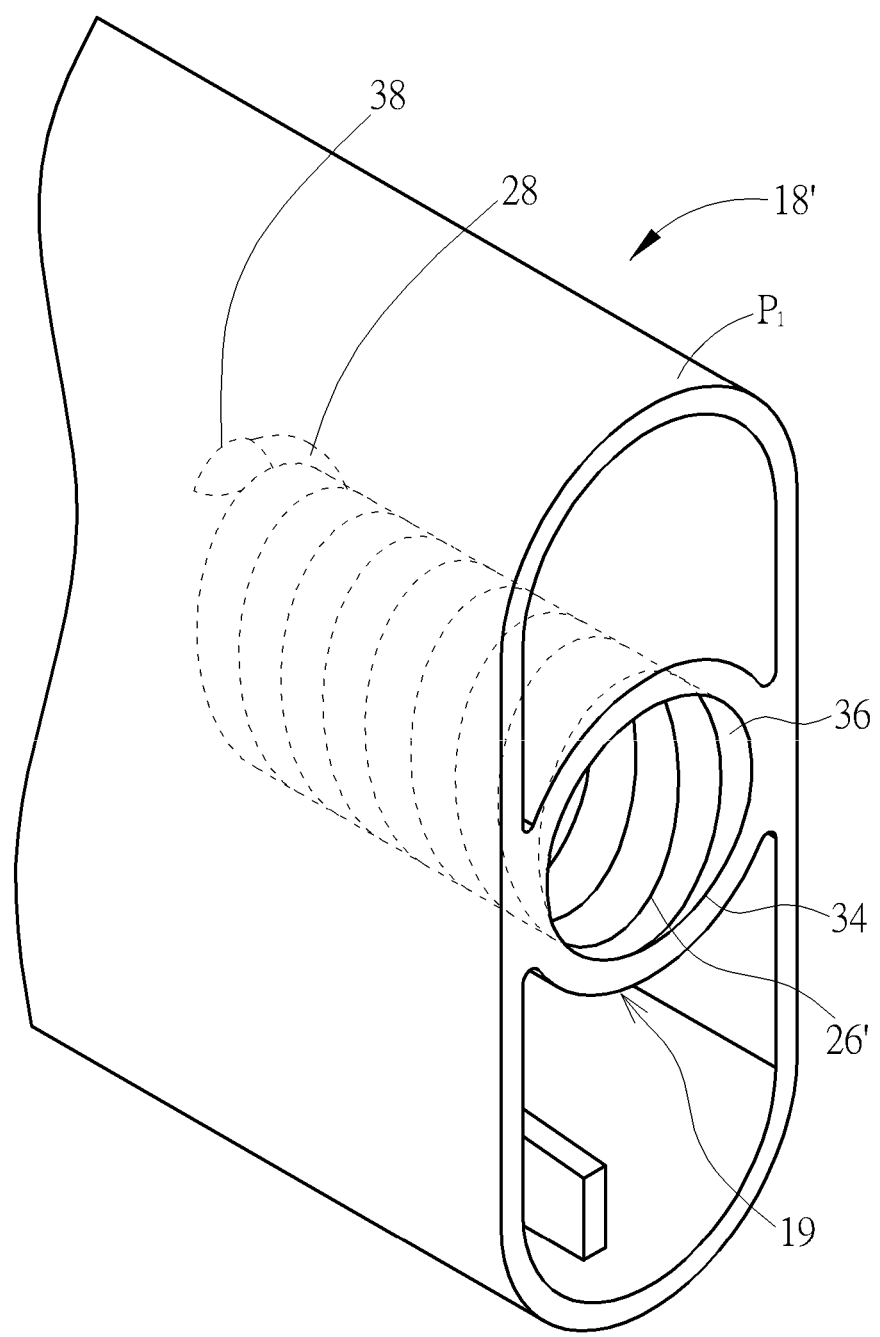
FIG. 9 is a partial enlarged diagram of a connection casing according to another embodiment of the present disclosure.

It should be mentioned that the guide portion design provided by the present disclosure is not limited to the aforesaid embodiments. That is, all the designs in which the tubular member is fixed in the connection casing via guidance of the protruding points of the tubular member and the guide portions in the connection casing may fall within the scope of the present disclosure. For example, please refer to FIG. 9, which is a partial enlarged diagram of a connection casing 18' according to another embodiment of the present disclosure. Components both mentioned in this embodiment and the aforesaid embodiments represent components with similar structures or functions, and the related description is omitted herein. As shown in FIG. 9, a first guide portion 26' could be a spiral guide rail spirally extending along the inner wall 36 of the tubular structure 19 of the connection casing 18', and a second guide portion 28 could be an arc-shaped guide rail extending from an end of the first guide portion 26' along the inner wall 36.

In another embodiment, the first guide portion could be a linear guide rail extending along the inner wall of the tubular structure, and the second guide portion could be a spiral guide rail spirally extending from an end of the first guide portion along the inner wall. The related description for this embodiment could be reasoned by analogy according to FIG. 9 and omitted herein. Furthermore, the present disclosure could adopt the one-sided engagement design for simplifying the structural design of the tubular member. For example, in another embodiment, the connection casing could only have the first guide portion and the second guide portion, and the tubular member could only have the first protruding point corresponding to the first guide portion. In such a manner, the first protruding point can move along the first guide portion to guide the tubular member to be inserted into the connection casing and then move along the second guide portion to be engaged with the concave hole, so as to fix the tubular member in the connection casing steadily. As for the other related description for the derived embodiments, it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A containing module comprising:
   a connection casing having a first end portion and a second end portion and comprising a tubular structure, the tubular structure extending inwardly from the first end portion and having a first guide portion and a second guide portion, the first guide portion extending along an inner wall of the tubular structure, the second guide portion extending from an end of the first guide portion along the inner wall;
   a first connection member pivoted to the second end portion;
   a second connection member pivoted to the second end portion; and
   a tubular member having a first protruding point protruding from the tubular member corresponding to the first guide portion, the first protruding point being movable along the first guide portion and the second guide portion.

2. The containing module of claim 1, wherein the first guide portion is a linear guide rail extending along the inner wall, and the second guide portion is an arc-shaped guide rail.

3. The containing module of claim 2, wherein the first guide portion and the second guide portion are perpendicular to each other.

4. The containing module of claim 1, wherein an end of the second guide portion has a concave hole, and the first protruding point is movable along the second guide portion to be engaged with the concave hole for fixing the tubular member in the connection casing.

5. The containing module of claim 1, wherein the tubular member further has an elastic arm, and the elastic arm is formed on the tubular member and extends to be connected to the first protruding point.

6. The containing module of claim 1, wherein a second protruding point protrudes from the tubular member, the first protruding point and the second protruding point are located at two sides of the tubular member respectively, a third guide portion and a fourth guide portion are formed on the tubular structure corresponding to the second protruding point, the third guide portion extends from along the inner wall of the tubular structure, the fourth guide portion extends from an end of the third guide portion along the inner wall, and the second protruding point is movable along the third guide portion and the fourth guide portion.

7. The containing module of claim 1, wherein the first guide portion is a spiral guide rail spirally extending along the inner wall, and the second guide portion is an arc-shaped guide rail.

8. The containing module of claim 1, wherein the first guide portion is a linear guide rail extending along the inner wall, and the second guide portion is a spiral guide rail.

9. The containing module of claim 1, wherein a depth of the first guide portion is less than a depth of the second guide portion.

10. The containing module of claim 1, wherein a holding portion is formed on an end of the tubular member.

11. The containing module of claim 1, wherein the tubular structure and the tubular member are in a hollow cylindrical shape.

12. A portable electronic device comprising:
a first body;
a second body; and
a containing module, the first body being rotatable relative to the second body via the containing module, the containing module comprising:
a connection casing having a first end portion and a second end portion and comprising a tubular structure, the tubular structure extending inwardly from the first end portion and having a first guide portion and a second guide portion, the first guide portion extending along an inner wall of the tubular structure, the second guide portion extending from an end of the first guide portion along the inner wall;
a first connection member fixed to the first body and pivoted to the second end portion;
a second connection member fixed to the second body and pivoted to the second end portion; and
a tubular member containing an antenna and having a first protruding point protruding from the tubular member corresponding to the first guide portion, the first protruding point being movable along the first guide portion and the second guide portion.

13. The portable electronic device of claim 12, wherein the first guide portion is a linear guide rail extending along the inner wall, and the second guide portion is an arc-shaped guide rail.

14. The portable electronic device of claim 13, wherein the first guide portion and the second guide portion are perpendicular to each other.

15. The portable electronic device of claim 12, wherein an end of the second guide portion has a concave hole, and the first protruding point is movable along the second guide portion to be engaged with the concave hole for fixing the tubular member in the connection casing.

16. The portable electronic device of claim 12, wherein the tubular member further has an elastic arm, and the elastic arm is formed on the tubular member and extends to be connected to the first protruding point.

17. The portable electronic device of claim 12, wherein a second protruding point protrudes from the tubular member, the first protruding point and the second protruding point are located at two sides of the tubular member respectively, a third guide portion and a fourth guide portion are formed on the tubular structure corresponding to the second protruding point, the third guide portion extends along the inner wall of the tubular structure, the fourth guide portion extends from an end of the third guide portion along the inner wall, and the second protruding point is movable along the third guide portion and the fourth guide portion.

18. The portable electronic device of claim 12, wherein the first guide portion is a spiral guide rail spirally extending along the inner wall, and the second guide portion is an arc-shaped guide rail.

19. The portable electronic device of claim 12, wherein the first guide portion is a linear guide rail extending along the inner wall, and the second guide portion is a spiral guide rail.

20. The portable electronic device of claim 12, wherein a depth of the first guide portion is less than a depth of the second guide portion.

* * * * *